United States Patent
Frankovich et al.

[19]

[11] Patent Number: 6,011,514
[45] Date of Patent: Jan. 4, 2000

[54] MEANS FOR EXTRACTING PHASE INFORMATION FOR RADIO FREQUENCY DIRECTION OF ARRIVAL

[75] Inventors: Joseph H. Frankovich, Arlington; Dale L. Reynolds, Springfield, both of Va.

[73] Assignee: The United States of America as represented by the Secretary of the Navy, Washington, D.C.

[21] Appl. No.: 09/178,536

[22] Filed: Oct. 26, 1998

[51] Int. Cl.[7] .................................................. G01S 5/04
[52] U.S. Cl. ................................ 342/442; 342/445
[58] Field of Search .................................... 342/442, 445, 342/156

[56] References Cited

U.S. PATENT DOCUMENTS 5,363,103   11/1994   Inkol .......................................... 342/13
5,724,047   3/1998    Lioio et al. ............................... 342/442
5,815,117   9/1998    Kolanek ................................... 342/442

*Primary Examiner*—Mark Hellner
*Attorney, Agent, or Firm*—Thomas E. McDonnell; Charles J. Stockstill

[57] ABSTRACT

The extraction of phase information for radio frequency (RF) direction of arrival is attained by pre-detect sensing and quantization of differential phase of a RF wave impinging on two or more antenna apertures, based on sensing and encoding differential phase without the use of conventional detection, and quantizing phase at or near the leading edge of a pulse signal. This is accomplished by detection of an intermediate frequency (IF) carrier, and encoding leading-edge phase (for each channel) in terms of near-phase-difference between two reference-oscillator readings containing the differential phase information—encoded as differential reference-oscillator phase. Precision angle-of-arrival is then derived from the measured differential reference-oscillator phase.

5 Claims, 2 Drawing Sheets

MEANS FOR EXTRACTING PHASE INFORMATION FOR RADIO FREQUENCY DIRECTION OF ARRIVAL

BACKGROUND OF THE INVENTION

1. Field of the Invention

This invention pertains generally to the determination of precision angle-of-approach in multi-beam radar systems and more specifically to the pre-detection sensing and quantization of differential phase of an radio frequency wave impinging on two or more antennas to provide precision angle-of-arrival.

2. Description of the Related Art

Multi-beam systems incorporating differential phase and/or time-of-arrival for angle-of-arrival (AOA) estimation rely primarily on post-detection methods for the encoding of delta time-of-arrival ($D_{TOA}$) or differential phase. These simultaneous multi-beams are parallel processed by using either detected-amplitude and $D_{TOA}$ comparisons or detected differential phase. Current- art multi-beam $D_{TOA}$ systems typically require large antenna spacing, due to inherent limitations in post-detection TOA measurement. Differential phase systems (interferometers) measure differential electrical phase through radio frequency (RF) mixing and integration, which can be severely contaminated by multipath or other phase distortions.

In conventional techniques the $D_{TOA}$ of a received signal from an antenna-pair spaced a given distance (d) can be calculated by $$D_{TOA} = \frac{d \sin\theta}{c} \qquad (1)$$

where d is the antenna separation in meters, c the velocity of light ($299.70532 \times 10^6$ m/s) and $\theta$ is angle-of-arrival.

Since current-art $D_{TOA}$ systems incorporate post-detection time-of-arrival sensing, quantization and resolution of time-of-arrival measurement is typically on-the-order of 50 ns. Further, use of post-detection affects the measured arrival time due to non-linearity and response limitations of the amplitude detector. If 50 ns is the quantization limit for a typical $D_{TOA}$ system, a desired AOA accuracy of $\theta < 1.0$ spatial degrees requires the receiving antenna-pair to be separated by approximately 865 meters. Due to the inability of current systems to measure time-of-arrival with high precision and subsequently the need for very large antenna spacing, current $D_{TOA}$ systems are best suited for multi-satellite, multi-aircraft, or radio astronomy instrumentation.

Additionally, differential phase systems are also quite limited. Multipath is a major contributor to this limitation. Incident RF waves that approach a differential phase system are joined a small time later by reflected waves. This causes distortions in both phase and amplitude at the antenna system. Depending on the geometry involved, these distortions can be observed only nanoseconds after the leading pulse edge. Current-art interferometers can not properly obtain AOA information under these circumstances.

SUMMARY OF THE INVENTION

The object of this invention is to provide a means for extracting phase information for measuring radio frequency (RF) direction-of-arrival of an RF wave impinging on two or more antenna apertures.

This and other objectives are attained by pre-detect sensing and quantization of differential phase of a radio frequency (RF) wave impinging on two or more antenna apertures, based on sensing and encoding differential phase without the use of conventional detection, and quantizing phase at or near the leading edge of a pulse signal. This is accomplished by detection of an intermediate frequency (IF) carrier, and encoding leading-edge phase (for each channel) in terms of near-instantaneous-phase of a precision common reference-oscillator reading. The resulting phase difference between channels contains the differential phase information—encoded as differential reference-oscillator phase. Precision angle-of-arrival is then derived from the measured differential reference-oscillator phase.

DESCRIPTION OF THE PREFERRED EMBODIMENT

A device for extracting phase information for measuring radio frequency (RF) direction-of-arrival is based on first, predetection sensing (threshold crossing) of a pulsed-carrier; secondly, near-instantaneous sampling of an analog reference-oscillator; thirdly, deriving phase-difference between reference-oscillator readings (snap-shots by each channel); and lastly, correcting phase-difference for frequency and converting the result to angle-of-arrival (AOA).

Figure 1:
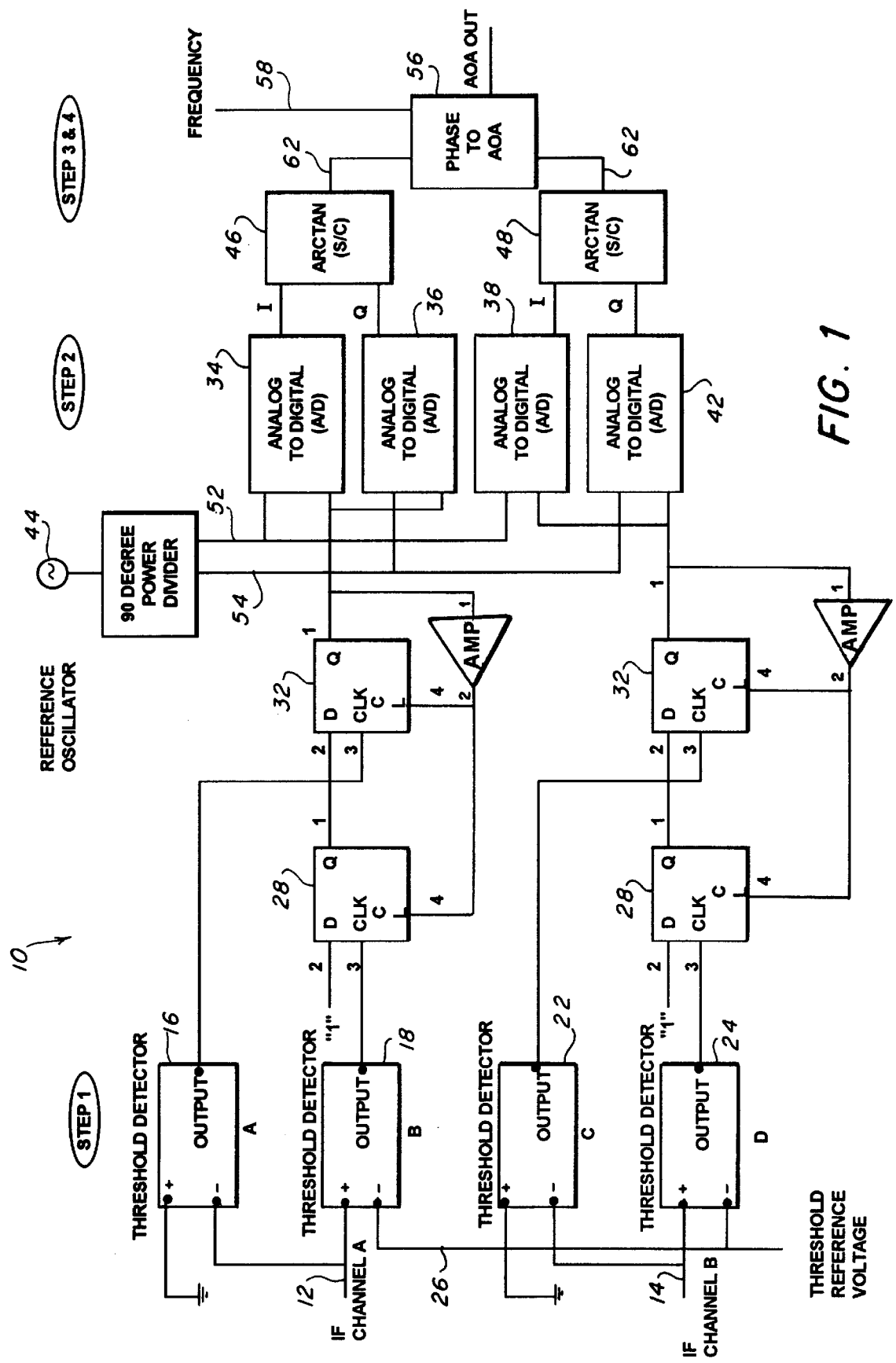
FIG. 1 shows a device for extracting phase information for measuring radio frequency direction-of-arrival.

Typically, a dual channel RF heterodyne receiver 10, as shown in FIG. 1, utilizing a common local oscillator (LO) provides a required two intermediate frequency (IF) channels (IF channel-A and IF channel-B), 12 and 14, respectively. Each IF channel 12 and 14 is processed through associated dual threshold detectors 16–24. The first threshold detectors (threshold-B 18 and threshold-D 24) for both channels 12 and 14 share common threshold reference voltage 26 and are used to detect that a signal is present. The shared threshold voltage is set typically to prevent thermal noise from causing threshold crossing, or false alarms. As the IF pulse develops, the first rising- cycle of the pulsed-signal to cross the threshold voltage 26 setting causes the output of threshold- detectors B 18 and D 24 to activate (clock) flip-flop (FF) #1 28, which provides an input to FF #2 32. The second threshold detectors (threshold-A 16 and threshold-C 22) for both channels 12 and 14, respectively, continuously thresholds at zero-crossing for both signal and noise. After FF #1 28 is set, FF #2 32 activates on the next trailing-cycle of the pulsed-signal to cross the negative threshold and provides an output for strobing the analog-to-digital (A/D) converters 34 and 36 for IF channel A 12 or 38 and 42 for IF channel B 14.

The output of FF #2 32 initiates a sample-strobe for the dual (quadrature) A/D converters (34, 36 and 38, 42) which sample the free-running reference-oscillator 44 producing an electromagnetic signal which is applied to the A/D converters of each channel 90° out of phase. The delayed output of FF #2 32 initiates a reset for both FF #1 28 and FF #2 32 to allow for the remaining process, and to recover for the next pulse. The encoded quadrature outputs (SINE/COSINE) of the A/Ds 34–42 are held for ARCTAN conversion 46 and 48 to unambiguously characterize the reference-oscillator 44 sample phase. Since both IF channels 12 and 14 incorporate quadrature A/Ds 34, 36 and 38, 42, respectively, to sample the common reference-oscillator 44, the channel-pair information is now encoded in terms of differential reference-oscillator 44 electrical phase. Subtracting the two reference-oscillator 44 phase measurements leaves the differential electrical phase as a result. Lastly, frequency 58 is used to scale the differential phase measurement 62 in order to correct for frequency offset from IF center. Results are then converted from phase to AOA 56.

The process discussed here has utility in both differential phase and $D_{TOA}$ measurement. $D_{TOA}$ information is maintained if the received RF is used directly at the IF input without down conversion. By using down-converted IF for threshold detection, any $D_{TOA}$ information once available is lost; this is because the threshold crossing of the IF is dependent upon the current phase of the LO when the RF is received. In order to maintain information, the RF received at each channel must be used for threshold detection without down conversion.

The differential phase method requires the use of a multi-channel receiving system like an interferometer to determine AOA. With this approach, phase differences from several channel pairs are decoded to produce a correct AOA measurement. Interferometers are well known to those skilled in the art and will not be discussed in detail herein.

Figure 2:
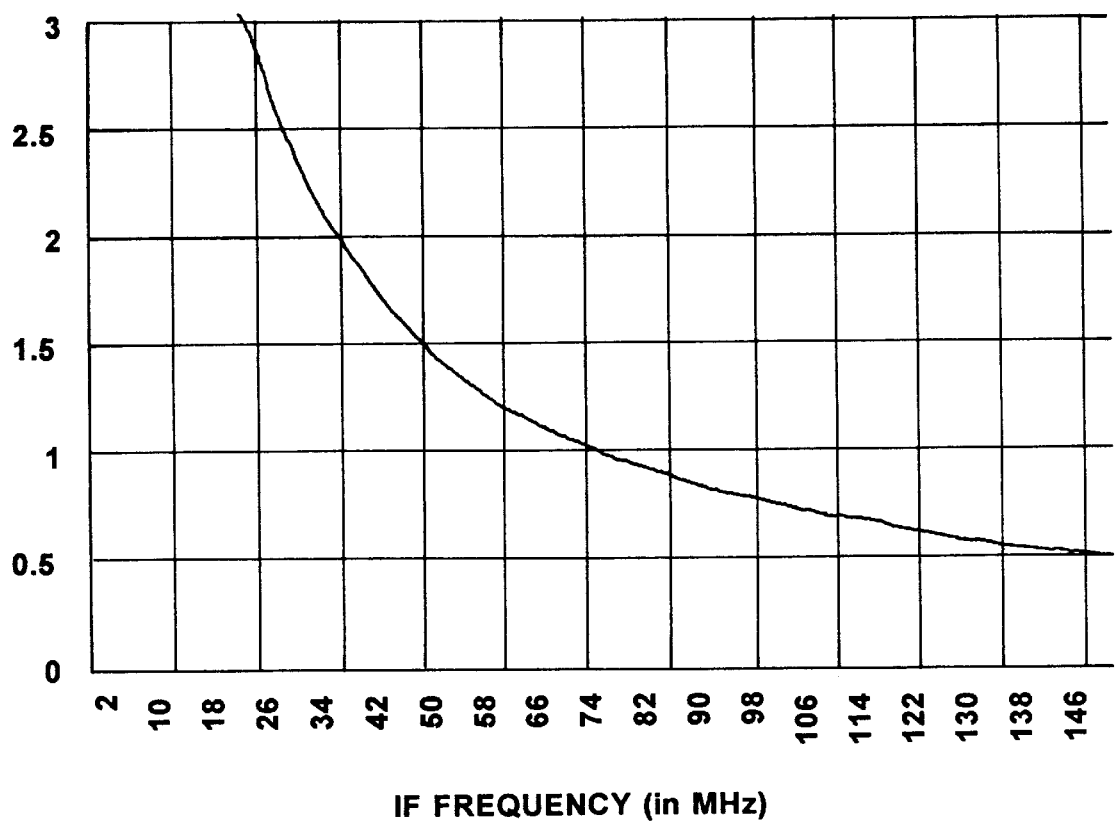
FIG. 2 shows the relationship between antenna-spacing and IF frequency to prevent ambiguity.

When directly edge detecting the RF signal, it should be noted that ambiguous conditions may occur for certain antenna spacings. For ambiguity consideration, two-channel single-pulse AOA accuracy is limited to approximately 3.8 degrees. This is due to two factors: phase ambiguity and cycle skipping. The maximum $D_{TOA}$ expressed in terms of reference-oscillator phase must not exceed 360 degrees to be unambiguous. Also, it is possible to cycle-skip (IF frequency cycle) during threshold crossing—one channel could threshold on a marginal IF cycle peak while the other channel crosses threshold a complete cycle later. For the second case, the condition can easily be recognized and corrected in real-time, but only if the selected IF frequency and antenna spacing combined permit sufficient phase ambiguity boundary. FIG. 2 shows the relationship between antenna-spacing and IF frequency to prevent ambiguity.

To prevent ambiguity, full-scale $D_{TOA}$ (±90° AOA) represented at IF must not exceed approximately 0.25 of the highest valid IF frequency wavelength period. Also, as can be observed from FIG. 2, much above 3 m antenna spacing results in an excessively low IF frequency which is impractical for most pulsed applications.

It should be further noted that ambiguities may be resolved (decoded) using a multi-channel approach. A multiple reference oscillator system may be used to sort out phase ambiguities. With this method, one snapshot is taken of several different-frequency reference oscillators simultaneously for both channels. The additional channels provide enough information to resolve ambiguities.

Two examples are discussed below that apply the concepts of this invention and provide a design synthesis approach for estimating both the effects of primary error conditions and AOA accuracy. Both examples are provided primarily to illustrate the validity and utility of the concept described above. The first example employs direct edge detection of the impinging RF signal and a $D_{TOA}$ analysis to decode AOA. The second example utilizes phase difference measurements from an interferometer to decode AOA.

EXAMPLE 1

Two Channel RF Detection

This example employs direct edge detection of the input RF to determine $D_{TOA}$ between two channels. The example shows that AOA accuracy on the order of 1.0 degree is achieved with a simple two-channel DTOA design having only one-meter antenna-pair spacing. The principles contained in this example may prove very useful to the user applying these principles. The example is based on the following assumptions:

| | |
|---|---|
| Antenna baseline length (d) | = 1 meter |
| Dual-channel receiver IF output ($F_{IF}$) (no down-conversion of RF) | = 80 MHz |
| Minimum signal-to-noise (SNR) | = 20 dB |
| Analog-to-digital sample window (aperture $\sigma_s$) | = 10 ps |
| Analog-to-digital quantization)$\sigma_q$ | = 8 bits |
| No channel-pair differential bias errors. | |

In this example, a review of the generalized expression that describes the relationship between differential time-of-arrival and AOA is provided. Next, expressions are developed for estimating AOA error factors, which include signal-to-noise ratio (SNR), A/D conversion sample-window integration time, and quantization error. Other error conditions such as propagation effects, temperature, frequency measurement accuracy, reference-oscillator drift/phase-noise, etc., are other potential error contributors to be considered. However, these extended error contributors tend to be implementation-specific, and beyond the scope of this discussion.

From Eq. (1), differential time-difference ($D_{TOA}$) at the RF receiver input can be expressed as $$D_{TOA} = \frac{d \sin\theta}{c}$$

where d is the antenna separation in meters, c the velocity in light (299.70532×10⁶ m/s) and θ is angle-of-arrival.

For the assumed conditions, the maximum $D_{TOA}$ that can be experienced occurs when θ reaches ±90°, and is ±3.336 nanoseconds. $D_{TOA}$ can be extracted from the reference oscillator phase and used to estimate AOA. Previous $D_{TOA}$ concepts have relied principally on methods for directly encoding $D_{TOA}$ time information. Since the maximum $D_{TOA}$ is only approximately ±3 ns, differential-time needs to be measured in fractions of nanoseconds in order to be useful. This requires on the order of 10 to 20 GHz of digital processing speed.

The technique, as described in this example, encodes leading edge time-of-arrival (for each channel-pair) in terms of near-instantaneous carrier-phase of the common reference-oscillator. The resulting phase-difference between the two carrier-phase readings (snapshots of the reference-oscillator) contains the differential time-of-arrival information—now encoded as differential phase. The example assures the two RF receiving channels are amplitude and time (group-delay) tracked.

Before evaluating AOA accuracy, various error contributors and uncertainties are considered. These result primarily from three sources: signal-to-noise ratio (SNR) ($\sigma_n$), analog-to-digital (A/D) sample window integration time (aperture time) ($\sigma_a$), and A/D sampling quantization ($\sigma_q$) error. Once determined, these contributors can then be used to approximate the final composite root-sum-square (RSS) error utilizing the formula $$\sigma_{RSS} = \sqrt{\sigma n^2 + \sigma a^2 + \sigma q^2} \quad (2)$$

First, uncertainty resulting from SNR is considered. For this example, it is assumed that the system must provide quality AOA estimation for weak signals near the noise-floor. Most quality RF systems operate down to on the order of 15 to 20 dB SNR before performance is noticeably degraded. In this example, 20 dB is chosen as the worst-case SNR. Assuming uniform distribution, phase-noise uncertainty (as a function of SNR) can be expressed by $$\sigma\phi = \frac{180}{\pi\sqrt{SNR}} \quad (3)$$

where SNR is signal to noise ratio, expressed in power and $\sigma\phi_n$ is RMS electrical phase uncertainty.

Given these assumed conditions, $\sigma\phi_n$ phase uncertainty in terms of time ($\sigma_n$), $$\sigma\varphi_n = \frac{180}{\pi\sqrt{100}} = 5.7° \text{ rms}$$

And, expressing $\sigma\phi_n$ electrical phase uncertainty in terms of time ($\sigma_n$), $$\sigma_n = \frac{\sigma\varphi_n}{360} 1/F_{IF}$$
$$= 0.1979 \text{ ns.}$$

next, quantization error ($\sigma\phi_n$) is considered, where an 8-bit A/D is assumed. If the A/D is scaled such that 8-BITs ($2^8$=256) are encoded for bi-polar I (inphase) and a second A/D encoded for bi-polar Q (quadrature) amplitudes, where each A/D equally encodes ±90 degrees of the reference-oscillator, average quantization error may be approximated in terms of half-scale for 980 electrical degrees as $$\sigma\phi_n = 90/128 = 0.703°$$

and converting phase to time, $$\sigma_n = \frac{\sigma\varphi_n}{360} 1/F_{IF}$$
$$= 0.0244 \text{ ns.}$$

Upon derivation of the primary error contributors, application of Eq. (2) provides estimation of the composite $\sigma_{RSS}$ uncertainty by $$\sigma_{RSS} = \sqrt{\sigma n^2 + \sigma a^2 + \sigma q^2}$$
$$= 0.0200 \text{ ns.}$$

And in summary, $\sigma_n = 0.1979$ ns,
$\sigma_a = 0.010$ ns,
$\sigma_q = 0.0244$ ns.

Drawing from the foregone analysis, the single-pulse AOA accuracy can be estimated. Later, the AOA accuracy given pulse averaging is determined which most modern AOA systems incorporate. Using Eq. (1), the single-pulse AOA accuracy can be derived by solving for θ and substituting $\sigma_{RSS}$ for $D_{TOA}$ as $$\theta = \sin^{-1}\left(\frac{c\sigma_{RSS}}{d}\right) \quad (4)$$
$$= 3.440°$$

The 3.440° solution represents the single-pulse worst-case AOA accuracy estimate for the assumed example.

It is further assumed that the AOA system incorporates pulse averaging, where several single-pulse estimates are accumulated and averaged prior to issuing an AOA measurement. The results are further improved. Modern systems typically average 8 t 16 pulses prior to outputting their estimates. Assuming error distributions are uniform (predominately influenced by noise), the average measurements are expressed in terms of $$\sigma_{AVG} = \sigma_{RSS} \frac{1}{\sqrt{n}} \quad (5)$$

where n is the number of pulses averaged.

if 16 pulses are assumed and $D_{TOA}$ averaging is performed prior to estimation of AOA, then $$\theta_{AVG} = \sin^{-1}\left(\frac{c\sigma_{AVG}}{d}\right)$$
$$= 0.86°.$$

EXAMPLE 2

Multichannel IF Detection

The second example employs direct edge detection of the input IF to determine delta phase between multiple channels and a single reference channel. This example shows that AOA accuracy on the order of 0.026 degrees is achieved with an interferometer with an antenna baseline of 1.2 m. The example is based on the following assumptions:

| | |
|---|---|
| Antenna baseline length (d) | = 1.2 meter; |
| Receiver frequency output (RF) | = 9 GHz; |
| Shared local oscillator frequency (LO) | = 9.16 GHz; |
| Down-converted intermediate frequency (IF) | = 160 MHz; |
| Minimum signal-to-noise ratio | = 20 dB; |
| Analog-to-digital sample window (aperture $\sigma_{at}$) | = 10 ps; |
| Analog-to-digital output quantization ($\sigma_q$) | = 8 bits; |
| Far field conditions only | |
| No channel-pair differential bias errors. | | here expressions are developed for estimating AOA error factors, which include signal-to-noise ratio (SNR), A/D conversion sample-window integration time, and quantization error. Other error conditions such as propagation effects, temperature, frequency measurement accuracy, reference-oscillator drift/phase-noise, etc., are other potential error contributors to be considered. However, these extended error contributors tend to be implementation-specific, and beyond the scope of this general example.

As in the first example, various error contributors and uncertainties are considered. These result primarily from three sources: signal-to-noise ratio (SNR) ($\sigma_n$), analog-to digital (A/D) sample window integration time (aperture time) ($\sigma_a$), and A/D sampling quantization ($\sigma_q$) error. Once determined, these contributors can then be used to approximate the final composite root-sum-square (RSS) error utilizing Eq.(2). First, uncertainty resulting from SNR is considered. For this example, it is assumed that the system must provide quality AOA estimation for weak signals near the noise-floor. Most quality RF systems operate down on the order of 15 to 20 dB SNR before performance is noticeably degraded. In this example, 20 dB SNR is chosen as the worst-case SNR. Assuming uniform distribution, phase-noise uncertainty (as a function of SNR) can be expressed by Eq.(3).

Given these assumed conditions, $\sigma\phi_n$ phase uncertainty is $$\sigma\varphi_n = \frac{180}{\pi\sqrt{100}} = 5.73° \text{ rms}$$

next, quantization error ($\sigma\phi_n$) is considered, where an 8-BIT A/D is assumed. If the A/D is scaled such that 8-BITs ($2^8=256$) are encoded for bipolar (inphase) and a second A/D encoded for bi-polar Q (quadrature) amplitudes, where each A/D equally encodes ±90 degrees of the reference-oscillator, average quantization error may be approximated in terms of half-scale for 90 electrical degrees as $$\sigma\phi_q = 90/128 = 0.703°$$

The sample window of the A/D converter, $\sigma_{at}$, is the final error considered. The window has a duration of 10 ps. With an IF frequency of 160 MHz, $\sigma_{at}$, can be expressed in terms of phase, $\sigma_a$, as follows:

$$\sigma_a = \sigma_{at} * F_{IF} * 360 \qquad (6)$$
$$= 5.76°.$$

With the primary contributors derived, application of Eq. (2) will provide estimation of the composite $\sigma_{RSS}$ uncertainty by $$\sigma_{RSS} = \sqrt{\sigma n^2 + \sigma n^2 + \sigma q^2}$$
$$= 5.80°.$$

And in summary,
$\sigma_n = 5.73°$,
$\sigma_a = 0.576°$,
$\sigma_q = 0.703°$.

drawing from the foregone analysis, the single-pulse AOA accuracy can be estimated. In an interferometer system, the error may be specified using the baseline (d) for calculations. Due to decoding methods, any error developed on the baseline channel pair will be seen in the decoded angle; while errors in the other channel pairs are usually insignificant because they are used to resolve ambiguities in the baseline pair. Starting with Eq. (1), convert time to phase and solve for angle. This gives an angle equation of $$\theta = \sin^{-1}\left(\frac{c\sigma_{RSS}}{d * F_{RF} * 360}\right) \qquad (7)$$
$$= 0.026°.$$

The 0.026° solution represents the single-pulse worst case AOA accuracy estimate for the assumed example. Averaging may be employed in this example, as previously shown, to further increase AOA accuracy.

The novel features of this invention involve pre-detect sensing and quantization of extremely fine differential phase of an RF wave impinging on two or more antenna apertures; where differential phase of a reference oscillator is used to estimate angle-of-arrival of the intercepted RF. Through direct sensing of an intermediate frequency (IF) carrier, by using either the RF directly or a downconverted IF, and encoding differential leading-edge time-of-arrival, in terms of near-instantaneous carrier-phase of a precision common-reference-oscillator, precision AOA measurement is provided with relative short antenna spacing.

This invention has several notable advantages: accuracy is limited only by the ability to recognize exact carrier threshold-crossing and A/D sample-window time; quantization is limited only by the A/D resolution; AOA estimation using leading-edge detection is inherently resistant to low-grazing-angle multi-path; and time-based AOA estimation accuracy does not degrade inversely with frequency.

Notably, the first two advantages, with currently available components (ECL/MECL) permit $D_{TOA}$ extraction and quantization approaching 10 picoseconds. Since low grazing angle multi-path is a severe problem for over-water and other low-angle highly reflective surfaces, the third advantage offers an attractive alternative for such applications. The final advantage is very important when precision AOA is needed over broad frequency bandwidths or lower frequency band operation.

In addition to precision AOA, the concepts of this invention can be extended to provide RF frequency measurement and multipath recognition/correction. Since the invention is based on measuring precise differentials (or elapsed time) in terms of carrier-phase of the reference-oscillator, carrier-cycle time can be precisely measured for an intercepted signal. Strobing the A/Ds for each received carrier cycle derives the cycle-frequency of the signal to the accuracy and resolution of the reference-oscillator and A/D sample window, respectively. Further, accumulating several cycle-period measurements and performing an average accomplishes increased frequency measurement precision.

Also, accumulating cycle-period measurements throughout the RF pulse discerns the presence and influence of low grazing angle multipath. Low grazing angle multipath involves the convolution of two received RF waves imitating from the same radiator, where the first to be received is the direct and the second the reflected path. By definition, the reflected path is delayed from the direct and convolves after several direct cycles have arrived. During arrival of the reflected wave, convolution of the two waves produces composite phase (or frequency) discontinuities. Accumulating several cycle-period measurements beginning at the earliest point of the pulses rising-edge, and performing cycle-period comparisons as the Rf pulse develops, indicates the RF cycle when convolution begins by presence of phase discontinuity; also, the magnitude and sign of the phase corruption caused by the convolution is observed.

Although the invention has been described in relation to an exemplary embodiment thereof, it will be understood by those skilled in the art that still other variations an modifications can be affected in the preferred embodiment without detracting from the scope and spirit of the invention as described in the claims.

What is claimed is:

1. A device for extracting phase information for measuring radio frequency direction-of-arrival comprised of:
   means for predetection sensing of a pulsed carrier;
   means for near-instantaneous sampling of a plurality of readings from an analog reference-oscillator;
   means for deriving phase-difference between the analog reference-oscillator readings; and means for correcting phase-difference for frequency and converting the corrected phase-difference to an angle-of-arrival.

2. A device for extracting phase information for radio frequency (RF) direction of arrival of a radio frequency (RF) wave impinging on two or more antenna apertures comprised of:

means receiving two or more pulsed radio frequency signals impinging on two or more antenna apertures that utilizes a common oscillator and providing a plurality of intermediate frequency signal channels;

means for detecting the threshold voltage of each intermediate frequency signal;

means for detecting a zero-crossing in the intermediate frequency signal after the threshold voltage has been reached and providing an output to activate a plurality of analog-to-digital converters in each channel;

means for providing a free-running reference-oscillator at a predetermined electromagnetic signal frequency;

means for dividing the output of the reference-oscillator into two signals 90° out of phase and applying each phase to a corresponding first and second analog-to-digital converter in each channel;

said first and second quadrature analog-to-digital converters encode the signal information from the respective channels in terms of reference-oscillator electrical phase;

means for subtracting the reference-oscillator phase measurements in each channel to provide a signal corrected for frequency offset between the reference-oscillator and the input intermediate frequency signal; and means for detecting a threshold voltage of each intermediate frequency;

means for detecting a zero-crossing in the intermediate frequency signal after threshold voltage has been reached and providing an output to activate an analog-to-digital converter in each channel;

means for providing an free-running reference-oscillator at a predetermined electromagnetic signal frequency;

means for dividing the output of the reference oscillator into two signals 90° out of phase and applying each phase to a second quadrature analog-to-digital converter in each channel;

said first and second quadrature analog-to-digital converters encode the signal information from the respective channels in terms of differential reference-oscillator electrical phase;

means for subtracting the reference-oscillator phase measurements in each channel to provide a signal corrected for frequency offset from a center intermediate frequency center frequency;

means for converting the differential phase measurement corrected for frequency offset to an angle-of-arrival of the radio frequency (RF) wave impinging on two or more antenna apertures.

3. A means for extracting phase information for measuring radio frequency direction-of-arrival comprised of the steps of:

predetection sensing of a pulsed carrier;

near-instantaneous sampling of a plurality of readings from an analog reference-oscillator;

deriving phase-difference between the analog reference-oscillator readings; and correcting phase-difference for frequency and converting the corrected phase-difference to an angle-of-arrival.

4. A method for utilizing edge detection of impinging radio frequency signals on a plurality of antenna apertures to determine the angle-of-arrival of these signals, comprising the steps of:

receiving a pulsed radio frequency signal impinging on two or more antenna apertures that utilize a common oscillator and provide a plurality of intermediate frequency signal channels;

detecting a threshold voltage crossing of the radio frequency signal in each channel;

providing an electromagnetic signal of a predetermined frequency from a free running reference-oscillator;

dividing an output of the reference-oscillator into two signal 90° out of phase;

applying each phase to a first and second quadrature analog-to-digital converter in each channel;

detecting a zero-crossing in the input radio frequency signal in each channel after threshold detection;

providing an output for activating the quadrature analog-to-digital converter in the corresponding channel;

encoding said first and second quadrature analog-to-digital converter signal information from a respective channel in terms of differential reference-oscillator electrical phase;

correcting the differential reference-oscillator phase in each channel for frequency offset of the input radio frequency signal from the reference-oscillator; and converting the differential phase, corrected for frequency offset, to an angle-of-arrival of the radio frequency wave impinging on the antenna apertures.

5. A method for utilizing phase difference measurements from an interferometer to determine the angle-of-arrival of a plurality of impinging radio frequency signals on a plurality of antenna apertures comprising the steps of:

receiving a pulsed radio frequency signal impinging on two or more antenna apertures that utilizes a common oscillator;

providing a plurality of intermediate frequency signal channels;

detecting a threshold voltage of each intermediate frequency signal;

providing an electromagnetic signal of a predetermined frequency from a free running reference-oscillator, dividing an output of the free running reference-oscillator into two signals 90° out of phase;

applying each phase to a corresponding first and second quadrature analog-to-digital converter in each channel;

detecting a zero-crossing in the input intermediate frequency signal in each channel after detection;

providing an output for activating the quadrature analog-to-digital converter in the corresponding channel;

encoding said first and second quadrature analog-to-digital converter signal information from respective channels in terms of differential reference-oscillator electrical phase;

correcting the differential reference-oscillator phase measurements in each channel for frequency offset of the intermediate frequency signal from the reference-oscillator; and converting the corrected differential phase measurements to an angle-of-arrival of the radio frequency wave impinging on the antenna apertures.

* * * * *